(12) United States Patent
Hu (10) Patent No.: US 12,104,742 B1
(45) Date of Patent: Oct. 1, 2024

(54) MOBILE DEVICE HOLDER FOR TRACKING SHOTS

(71) Applicant: Longfu Hu, Jieyang (CN)

(72) Inventor: Longfu Hu, Jieyang (CN)

( * ) Notice: Subject to any disclaimer, the term of this patent is extended or adjusted under 35 U.S.C. 154(b) by 0 days.

(21) Appl. No.: 18/733,048

(22) Filed: Jun. 4, 2024

(51) Int. Cl.
| | |
|---|---|
| *F16M 11/18* | (2006.01) |
| *F16M 11/08* | (2006.01) |
| *F16M 11/24* | (2006.01) |
| *G03B 17/56* | (2021.01) |
| *H04N 23/66* | (2023.01) |
| *H04N 23/695* | (2023.01) |

(52) U.S. Cl.
CPC ............ *F16M 11/08* (2013.01); *F16M 11/18* (2013.01); *F16M 11/242* (2013.01); *G03B 17/561* (2013.01); *H04N 23/66* (2023.01); *H04N 23/695* (2023.01); *F16M 2200/024* (2013.01)

(58) Field of Classification Search
CPC ... G03B 17/561; G03B 17/563; H04N 23/695
See application file for complete search history.

(56) References Cited

U.S. PATENT DOCUMENTS

| | | | | |
|---|---|---|---|---|
| 2023/0209199 | A1* | 6/2023 | Chen | F16M 11/123 |
| 2024/0218969 | A1* | 7/2024 | Liao | F16M 11/18 |

FOREIGN PATENT DOCUMENTS

| | | | | |
|---|---|---|---|---|
| CN | 110913137 | A | * | 3/2020 |
| CN | 210469439 | U | * | 5/2020 |
| CN | 212776380 | U | * | 3/2021 |
| CN | 212804970 | U | * | 3/2021 |

* cited by examiner

*Primary Examiner* — Leon W Rhodes, Jr.
(74) *Attorney, Agent, or Firm* — Birchwood IP (57) ABSTRACT

Disclosed is a mobile device holder for tracking shots, including a supporting rod with one end being provided with a foldable tripod assembly, a rotating base rotationally installed at the other end of the supporting rod, a motor disposed inside the rotating base to drive the rotating base through the motor to rotate relative to the supporting rod, a clamping assembly with one end being rotationally connected to the rotating base, and the clamping assembly is configured to clamp an electronic device, a handle assembly with one end being rotationally connected to the rotating base, a camera lens disposed on the handle assembly or the clamping assembly, and an electric control board electrically connected to the motor and the camera lens to control operation of the motor according to images acquired by the camera lens through the electric control board.

17 Claims, 10 Drawing Sheets

MOBILE DEVICE HOLDER FOR TRACKING SHOTS

TECHNICAL FIELD

The present disclosure relates to the technical field of auxiliary shooting equipment, and particularly relates to a mobile device holder for tracking shots.

BACKGROUND

With the rise of the live streaming industry, the market demand for cellphone holders for live streaming is growing and becomes more specialized. Traditional cellphone holders for live streaming can only mount cellphones at a fixed angle. When livestreamers move around, the cellphones are incapable of following the moving livestreamers. Later, follow-up gimbals with tracking features were introduced. However, these gimbals require a separate cellphone holding mechanism, making them inconvenient to carry and use as a tracking cellphone holder.

Therefore, a new technical solution needs to be developed to address the above problems.

SUMMARY

An objective of the present disclosure is to provide a mobile device holder for tracking shots, to solve the technical problems of inconvenience in carrying and usage in the prior art.

In order to achieve the above objectives, a technical solution of the present disclosure provides a mobile device holder for tracking shots, including:

- a supporting rod, one end of the supporting rod is provided with a foldable tripod assembly;
- a rotating base, the rotating base is rotationally installed at the other end of the supporting rod;
- a motor, the motor is disposed inside the rotating base to drive the rotating base through the motor to rotate relative to the supporting rod;
- a clamping assembly, one end of the clamping assembly is rotationally connected to the rotating base, and the clamping assembly is configured to clamp an electronic device;
- a handle assembly, one end of the handle assembly is rotationally connected to the rotating base;
- a camera lens, the camera lens is disposed on the handle assembly or the clamping assembly; and
- an electric control board, the electric control board is electrically connected to the motor and the camera lens to control the operation of the motor according to images acquired by the camera lens through the electric control board.

Further comprising a locking assembly, wherein the locking assembly is disposed between the rotating base and the supporting rod, and the locking assembly has a locked state and an unlocked state; when the locking assembly is in the locked state, the rotating base cannot rotate relative to the supporting rod; and when the locking assembly is in the unlocked state, the rotating base can rotate relative to the supporting rod.

Further, wherein the locking assembly comprises a movable member and a plurality of teeth, the movable member is movably disposed on one side of the rotating base, a tooth groove is formed at one end of the movable member, and the plurality of teeth are annularly arranged at the other end of the supporting rod; when the locking assembly is in the locked state, the tooth groove is engaged with part of the teeth; and when the locking assembly is in the unlocked state, the tooth groove is disengaged from the teeth.

Further, wherein the locking assembly further comprises a positioning member, and the positioning member is disposed inside the rotating base, an elastic protrusion is disposed on one side of the positioning member facing the movable member, at least two grooves are formed at intervals on one side of the movable member facing the positioning member, and the movable member is slidably disposed in a vertical direction to cooperate with the grooves through the elastic protrusion and to position the sliding of the movable member.

Further, wherein a guide groove that extends vertically is formed on one side of the positioning member facing the movable member is provided with, the movable member is slidably disposed inside the guide groove, a sliding key is disposed on one side of the movable member away from the positioning member, a sliding groove is formed on one side of the rotating base, and the sliding key is slidably accommodated in the sliding groove.

Further, wherein a through groove is formed on the positioning member, an elastic plate is disposed inside the through groove, one end of the elastic plate is connected to one side wall of the through groove, and the elastic protrusion is disposed on one side of the elastic plate facing the movable member.

Further, wherein the rotating base comprises a base body and a bottom cover that are engaged to form an accommodating space between the base body and the bottom cover, the motor is installed inside the accommodating space, and a driving shaft of the motor passes through the bottom cover and is connected to the other end of the supporting rod.

Further, wherein the other end of the supporting rod is provided with an end cover, a slot is formed at a center of the end cover, and the driving shaft of the motor is inserted into the slot.

Further, wherein a rotating bearing is disposed between the bottom cover and the end cover, a bottom of the bottom cover protrudes downwards to form a tube wall, an accommodating cavity is formed on an upper portion of the end cover, an inner ring of the rotating bearing is sleeved on the tube wall, and an outer ring of the rotating bearing is accommodated in the accommodating cavity.

Further, wherein the rotating base is provided with a first lug portion, and one end of the handle assembly is provided with a second lug portion, such that the first lug portion and the second lug portion are rotationally connected by a pivot axis.

Further, wherein a first threading opening is formed on the first lug portion, the first threading opening is communicated with an interior of the rotating base, a second threading opening is formed on the second lug portion, and the second threading opening is communicated with an interior of the handle assembly.

Further comprising a battery, wherein the battery is configured to supply power to the electric control board and the motor, and the battery and the electric control board are both disposed inside the handle assembly.

Further comprising a remote controller, wherein the remote controller is in wireless connection with the electric control board, an accommodating groove is formed on the handle assembly, and the remote controller is removably accommodated inside the accommodating groove.

Further, wherein an opening is formed on one side wall of the accommodating groove, such that the remote controller slides into the accommodating groove or slides out of the accommodating groove through the opening, an inner wall of the accommodating groove is provided with a protruding rib, and a strip-shaped groove is formed on a side surface of the remote controller to guide the remote controller to slide into the accommodating groove or slide out of the accommodating groove through sliding cooperation between the protruding rib and the strip-shaped groove.

Further, wherein an elastic telescopic member is disposed on one end of the handle assembly, and a recess is formed on the rotating base, such that an end of the elastic telescopic member is snapped into the recess to prevent the handle assembly from rotating.

Further, wherein the elastic telescopic member comprises an elastic member and a rod member, the rod member is disposed inside the handle assembly, one end of the rod member penetrates out of one end of the handle assembly, and the elastic member is disposed between the other end of the rod member and an inner wall of the handle assembly.

Further, wherein a third lug portion is disposed on one end of the clamping assembly, and a fourth lug portion is disposed on the rotating base, such that the third lug portion and the fourth lug portion are rotationally connected through a bolt.

It can be seen from the above technical solution that the mobile device holder for tracking shots in the present disclosure, the electronic device, such as a mobile phone or an iPad, is clamped by the clamping assembly for shooting, the camera lens then captures and acquires the human face images, such that the electric control board controls the motor to drive the rotating base, the clamping assembly and the electronic device to rotate according to images acquired by the camera lens, and the electronic device can always accurately focus and record videos, so as to achieve a purpose of following a use for shooting; in addition, the tripod assembly and the clamping assembly are both foldable for storage, facilitating the portability and usage, the structure is simple and compact, the cost is low, and the user experience is better.

BRIEF DESCRIPTION OF DRAWINGS

In order to more clearly illustrate the technical solutions in the embodiments of the present disclosure, a brief introduction to the accompanying drawings required in the descriptions of the embodiments will be provided below.

DESCRIPTION OF EMBODIMENTS

In order to enable those skilled in the art to better understand the technical solution of the present disclosure, the technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those skilled in the art based on the embodiments in the present disclosure without creative efforts shall fall within the protection scope of the present disclosure.

Figure 1:
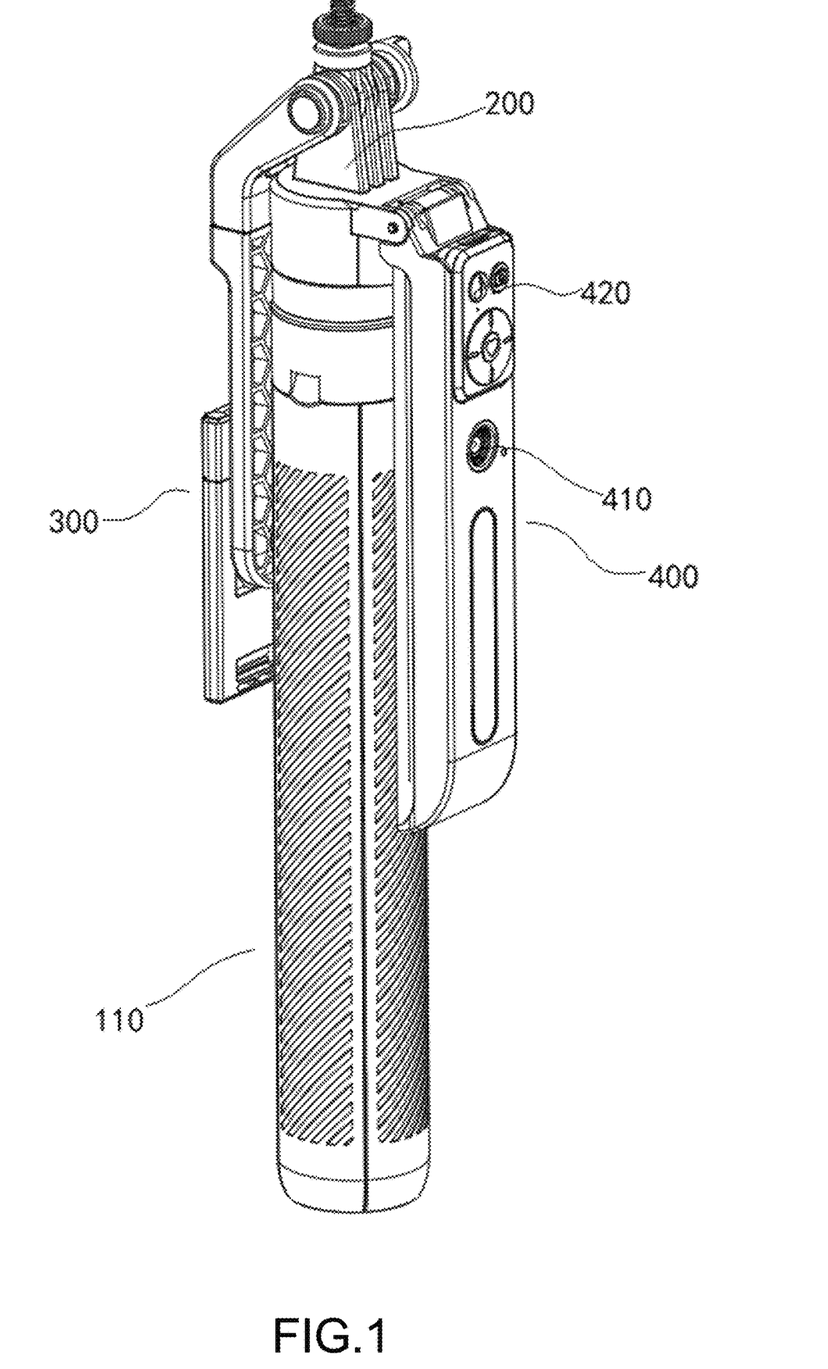
FIG. 1 is a structural schematic diagram of a mobile device holder for tracking shots in a folded storage state according to an embodiment of the present disclosure.
Figure 2:
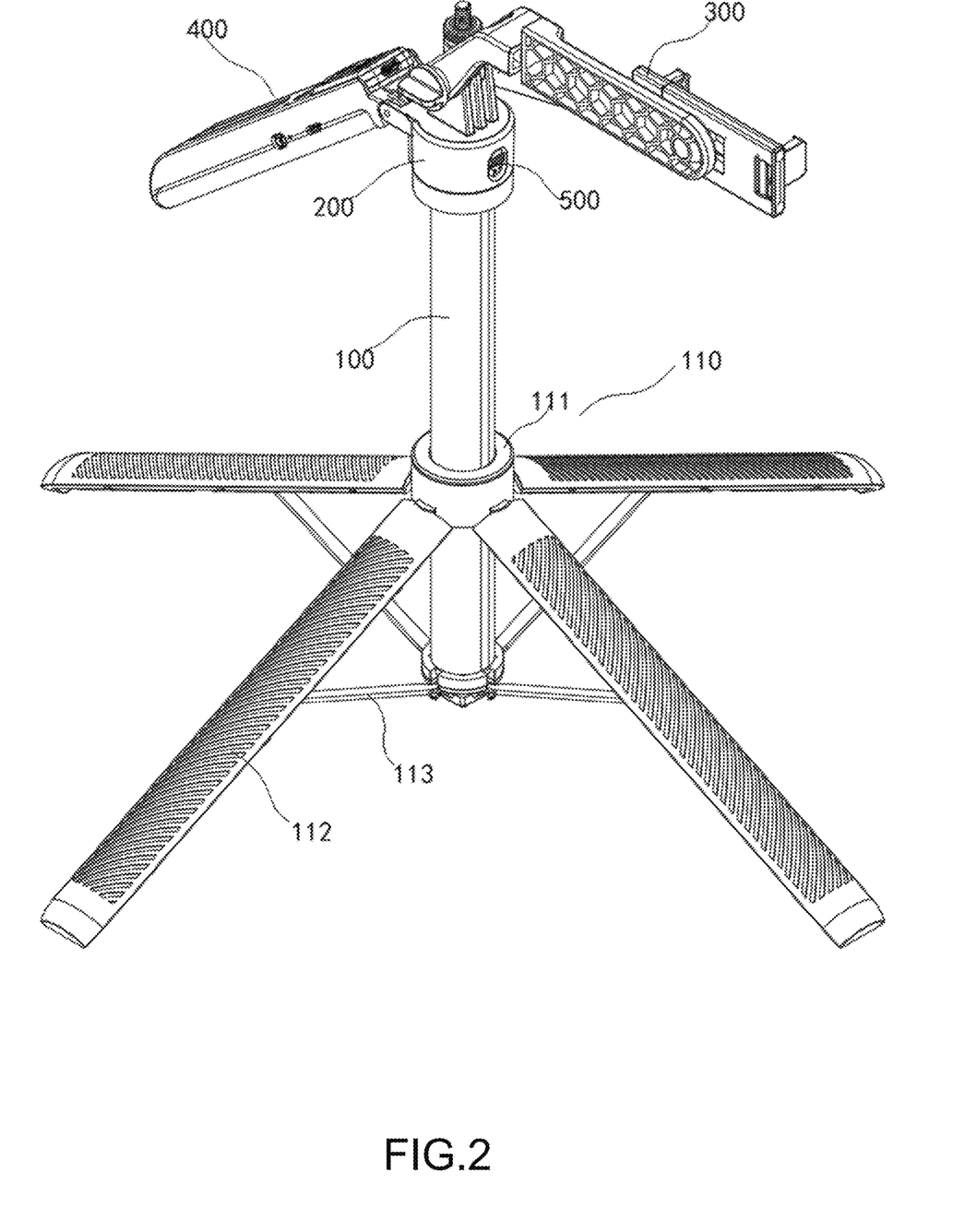
FIG. 2 is a structural schematic diagram of a mobile device holder for tracking shots according to an embodiment of the present disclosure.
Figure 3:
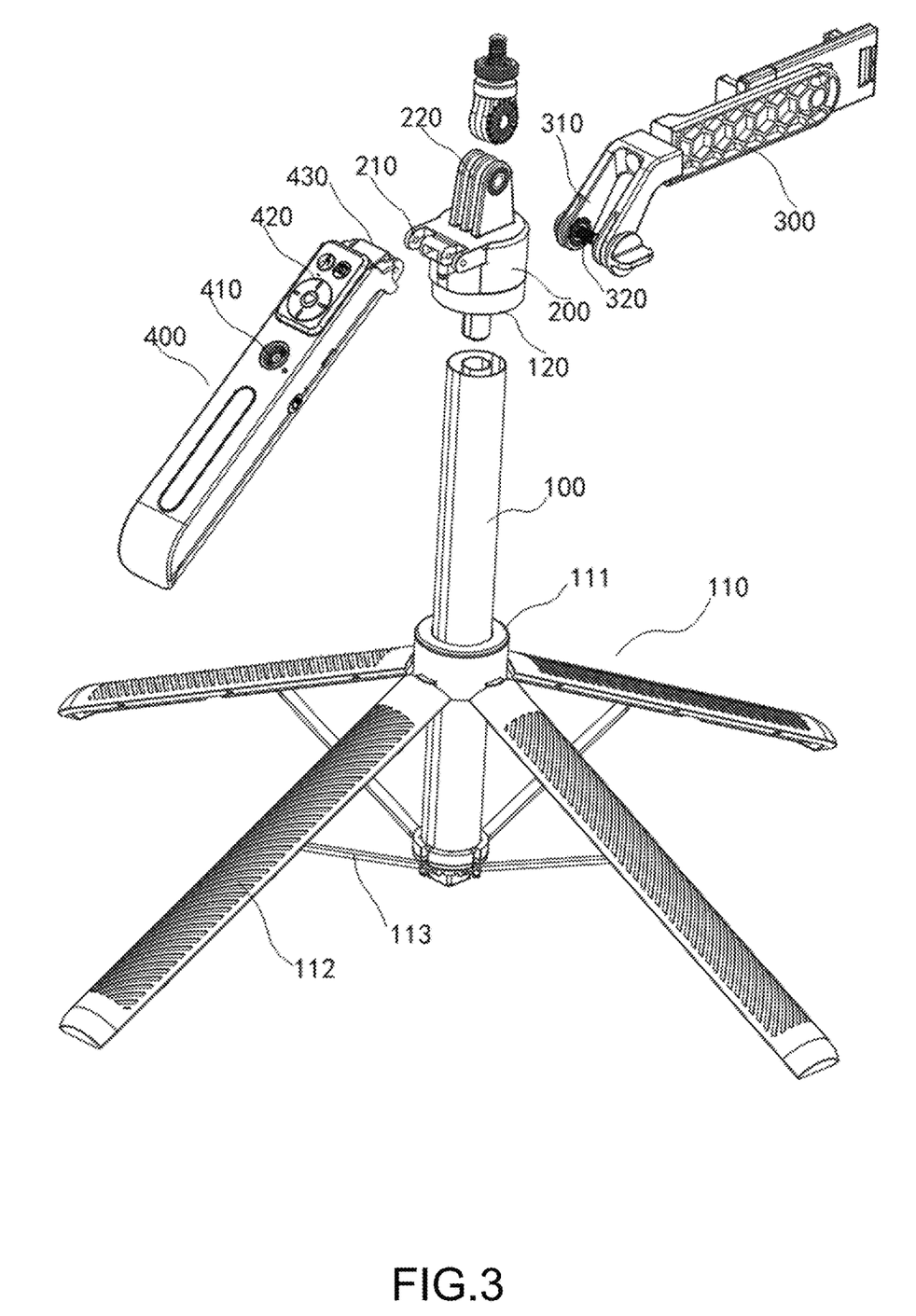
FIG. 3 is a structural exploded view of a mobile device holder for tracking shots according to an embodiment of the present disclosure.
Figure 4:
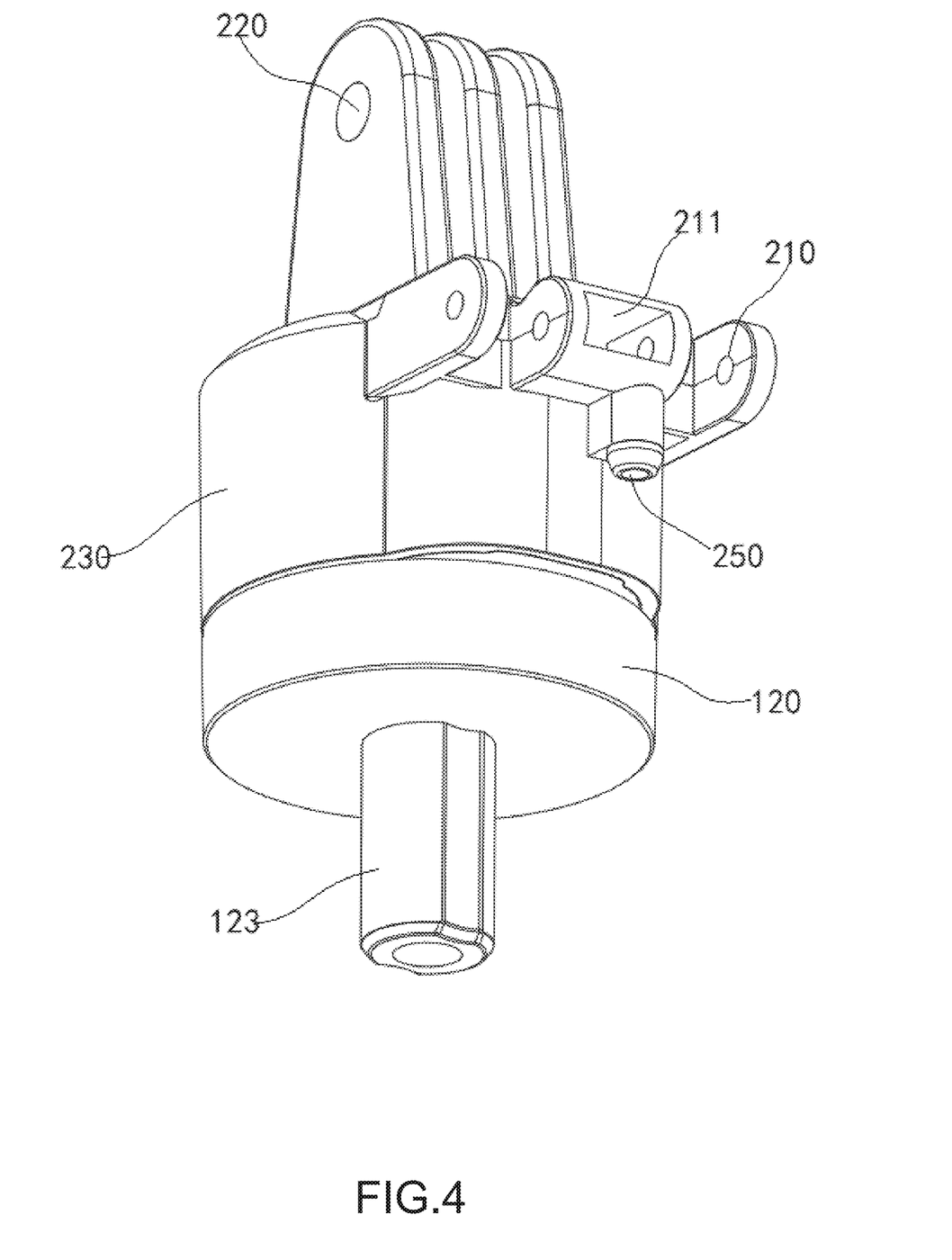
FIG. 4 is a structural schematic diagram when a rotating base, a motor and an end cover are combined according to an embodiment of the present disclosure.
Figure 5:
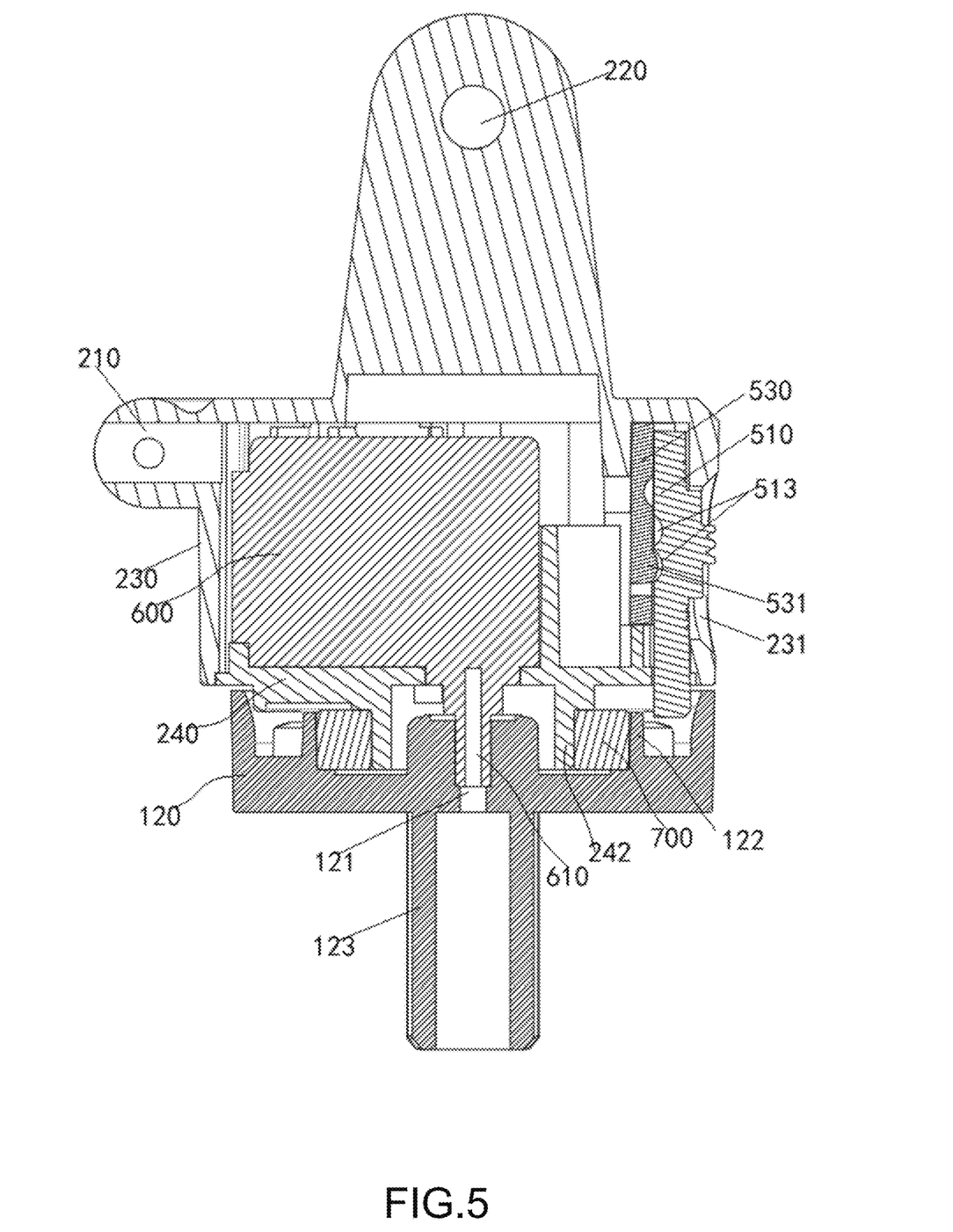
FIG. 5 is a sectional view when a rotating base, a motor and an end cover are combined according to an embodiment of the present disclosure.
Figure 6:
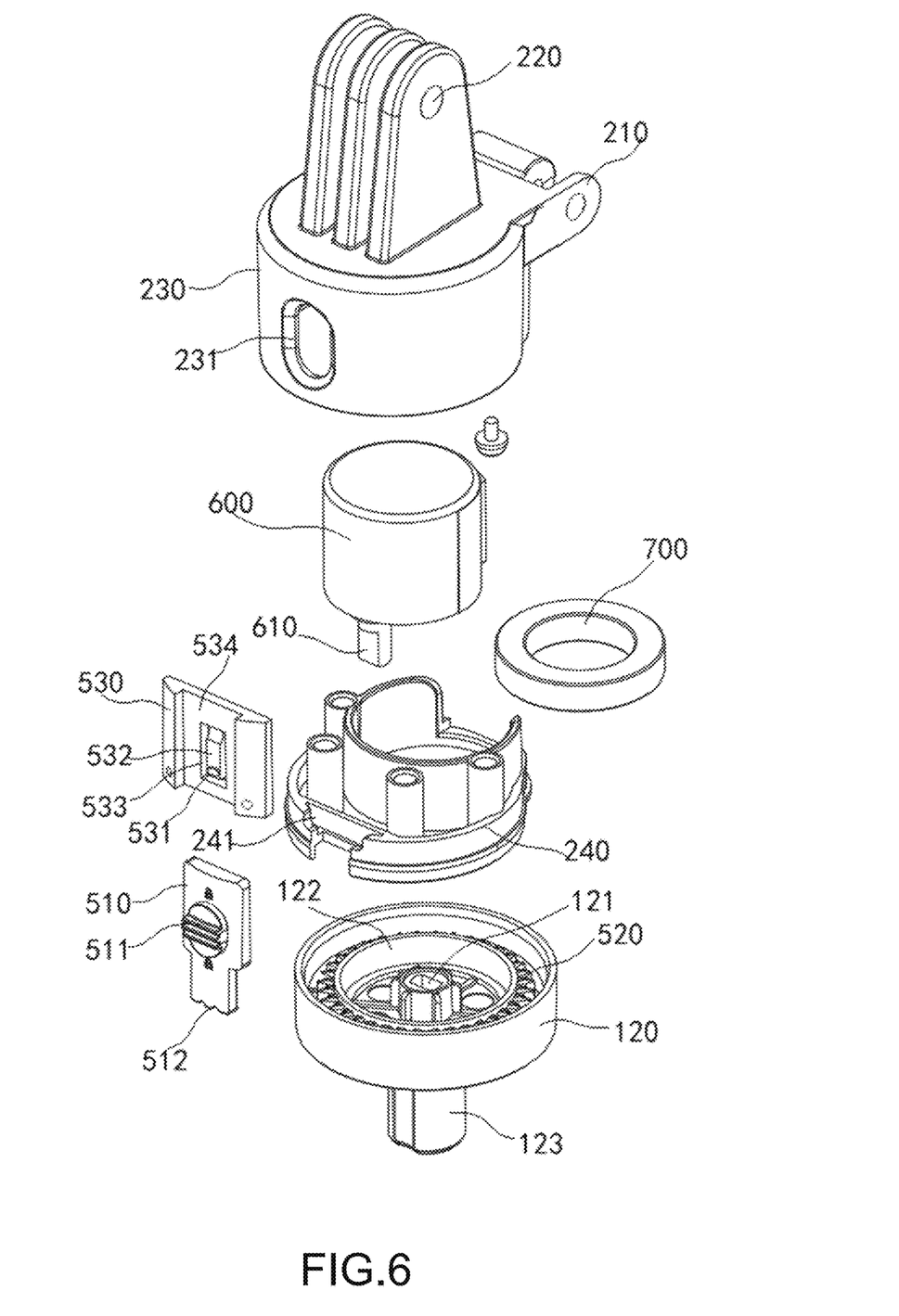
FIG. 6 is a structural exploded view when a rotating base, a motor and an end cover are combined according to an embodiment of the present disclosure.
Figure 7:
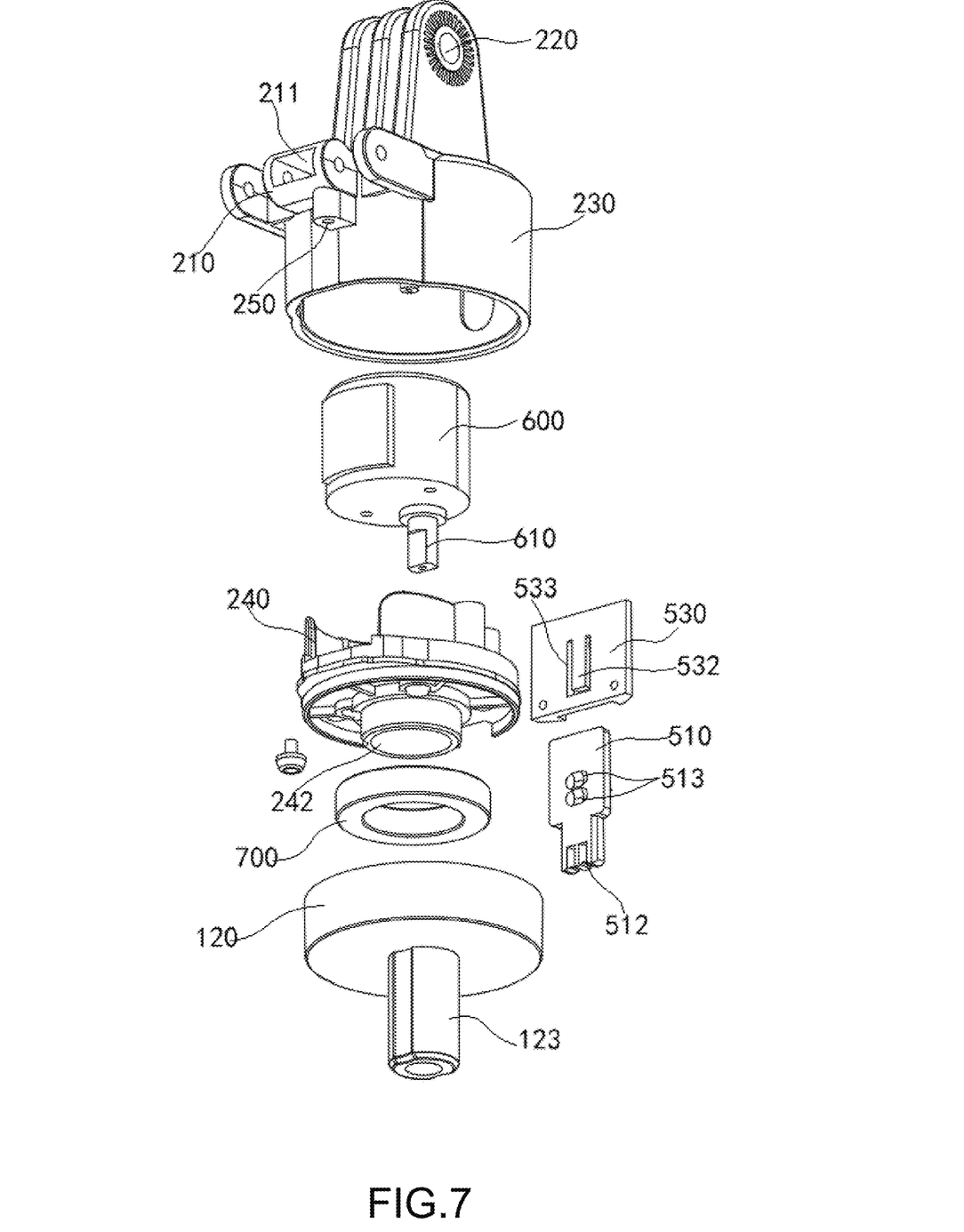
FIG. 7 is a structural exploded view from another view when a rotating base, a motor and an end cover are combined according to an embodiment of the present disclosure.
Figure 8:
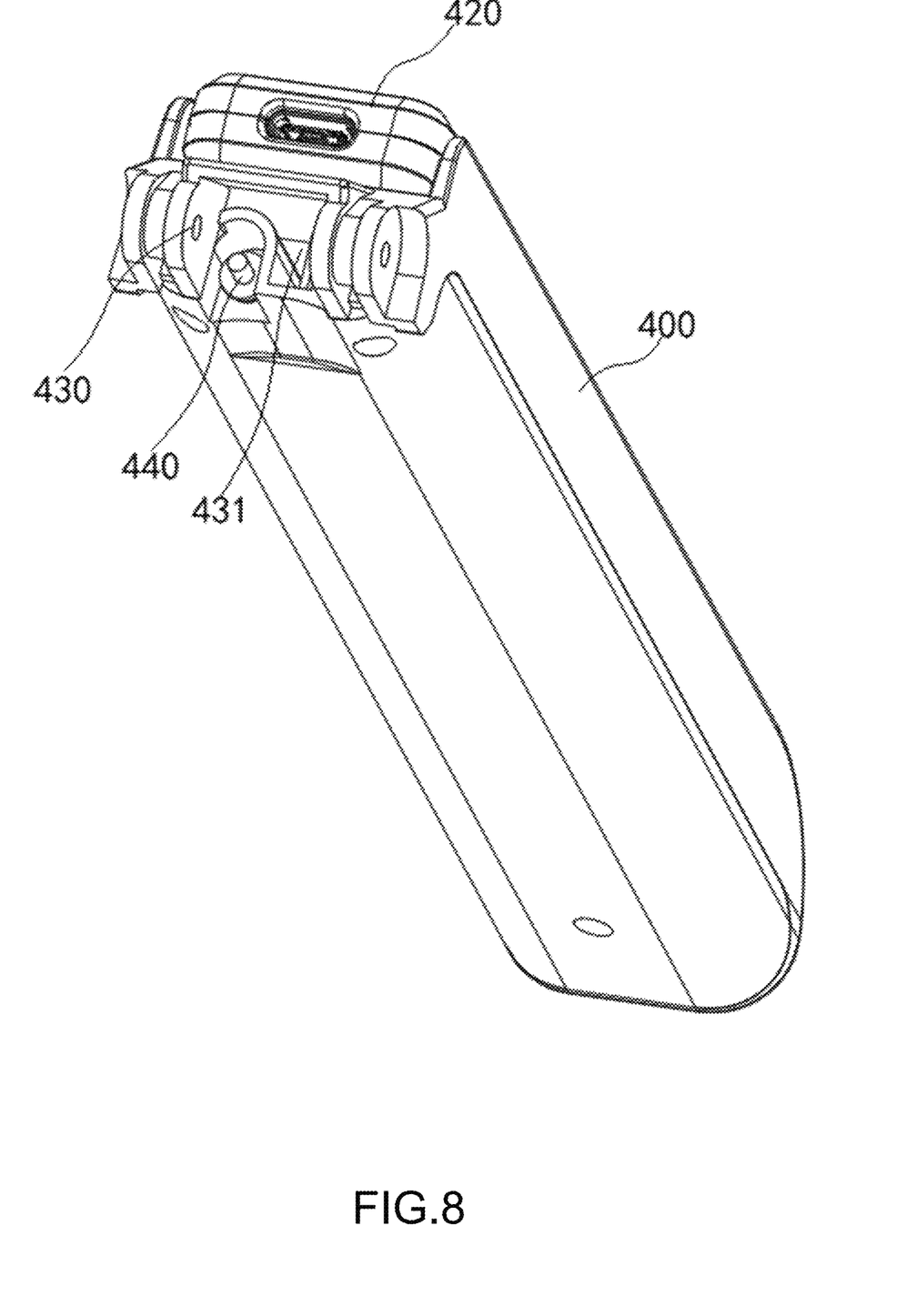
FIG. 8 is a structural schematic diagram of a handle assembly according to an embodiment of the present disclosure.
Figure 9:
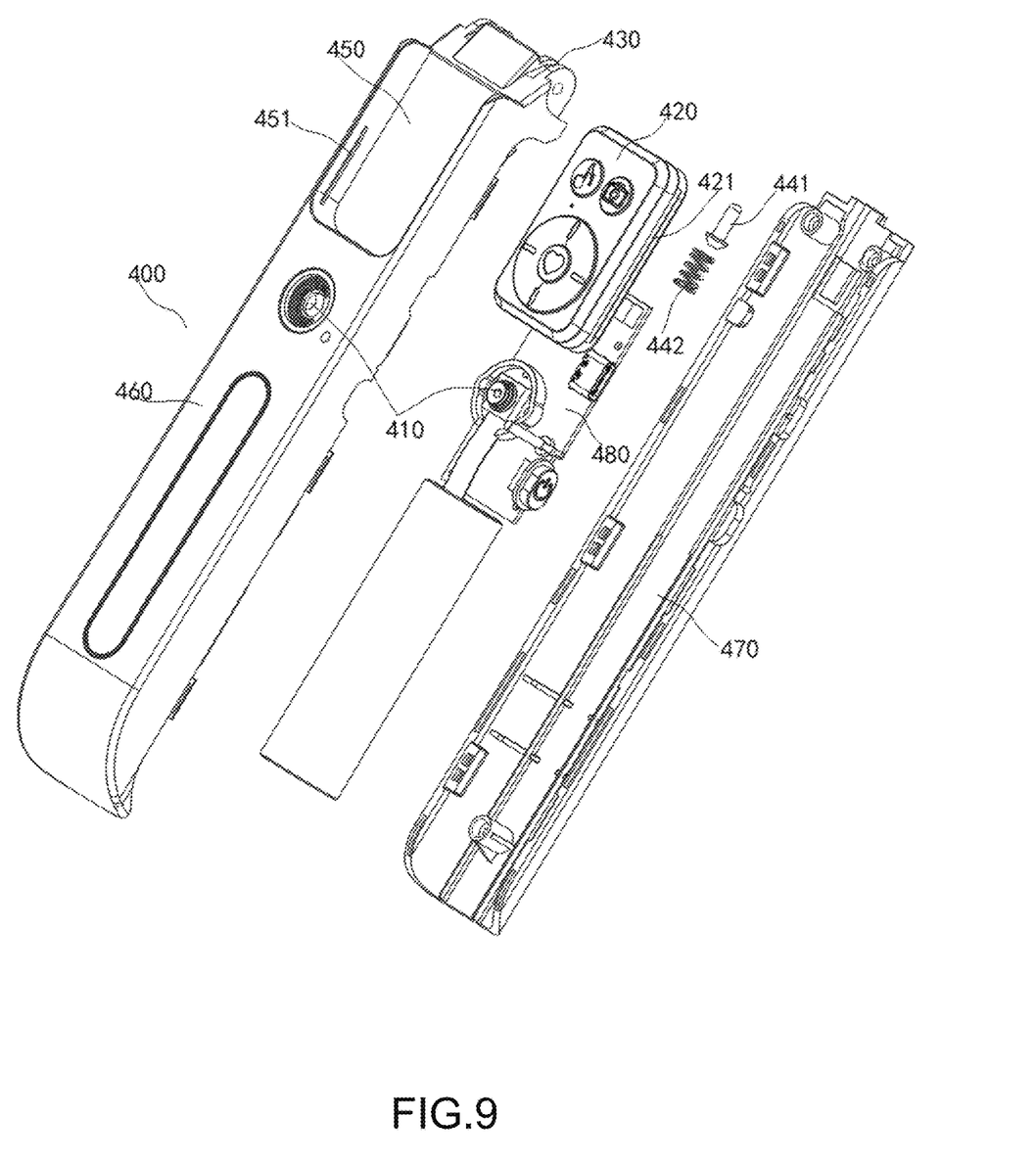
FIG. 9 is a structural exploded view of a handle assembly according to an embodiment of the present disclosure.
Figure 10:
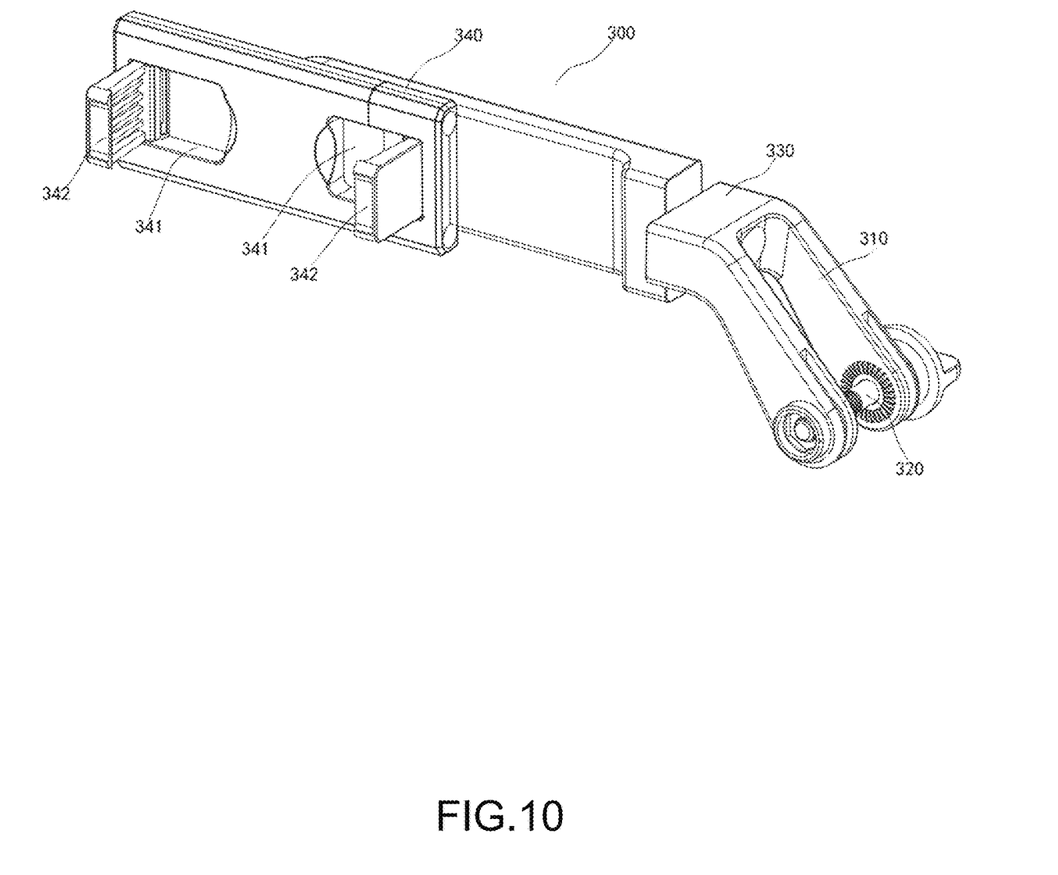
FIG. 10 is a structural schematic diagram of a clamping assembly according to an embodiment of the present disclosure.

With reference to FIGS. 1-10, this embodiment provides a mobile device holder for tracking shots, including a supporting rod 100, a rotating base 200, a motor 600, a clamping assembly 300, a handle assembly 400, a camera lens 410, and an electric control board 480, where one end of the supporting rod 100 is provided with a foldable tripod assembly 110, and the rotating base 200 is rotationally installed at the other end of the supporting rod 100; the motor 600 is disposed inside the rotating base 200 to drive the rotating base 200 to rotate relative to the supporting rod 100 through the motor 600; one end of the clamping assembly 300 is rotationally connected to the rotating base 200, and the clamping assembly 300 is configured to clamp an electronic device; and one end of the handle assembly 400 is rotationally connected to the rotating base 200, the camera lens 410 is installed on the handle assembly 400 or the clamping assembly 300, that is, the camera lens 410 is installed on a front side of the handle assembly 400 or the clamping assembly 300 in a manner that the camera lens 410 can always acquire human face images of a user, the electric control board 480 is disposed inside the handle assembly 400, and the electric control board 480 is electrically connected to the motor 600 and the camera lens 410, so as to control the operation of the motor 600 according to images acquired by the camera lens 410 through the electric control board 480, where the rotating base 200 is driven to rotate relative to the supporting rod 100 through rotation of a driving shaft 610 of the motor 600, such that the handle assembly 400 and the clamping assembly 300 on the rotating base 200, as well as the electronic device clamped on the clamping assembly 300 are capable of rotating together.

It can be seen that, for mobile device holder for tracking shots in this embodiment, electronic devices, such as a mobile phone or an iPad, is clamped by the clamping assembly 300 for shooting, the camera lens 410 then captures and acquires the human face images, such that the electric control board 480 controls the motor 600 to drive the rotating base 200, the clamping assembly 300 and the electronic device to rotate according to images acquired by the camera lens 410, and the electronic device can always accurately focus and record videos, so as to achieve a purpose of following a use for shooting; in addition, the tripod assembly 110 and the clamping assembly 300 are both foldable for storage, facilitating the portability and usage, the structure is simple and compact, the cost is low, and the user experience is better.

It should be noted that the electric control board 480 is integrated with a processor. In practical application, the camera lens 410 continuously captures or captures at intervals the human face images for multiple times, obtains digital image parameters and transmits the digital image parameters to the electric control board 480, and the electric control board 480 calculates and analyzes the received digital image parameter, and then controls the operation of the motor 600; and automatic tracking shots are realized by controlling forward rotation or reverse rotation of the motor 600, a screw base is rotationally installed on an upper end of the rotating base 200, and the screw base is configured to connect external devices in a threaded manner, such that a camera, a fill light and other external devices can be connected to the crew base in a threaded manner to enrich functions of the mobile device holder for tracking shots.

In this embodiment, the mobile device holder for tracking shots further includes a locking assembly 500, the locking assembly 500 is disposed between the rotating base 200 and the supporting rod 100, and the locking assembly 500 has a locked state and an unlocked state. When the locking assembly 500 is in the locked state, the rotating base 200 cannot rotate relative to the supporting rod 100; when the locking assembly 500 is in the unlocked state, the rotating base 200 can rotate relative to the supporting rod 100, in such a way, when the user does not need to perform tracking shots, that is, the rotating base 200 does not need to rotate relative to the supporting rod 100, the rotating base 200 can be locked relative to the supporting rod 100 through the locking assembly 500 to prevent the rotating base 200 from rotating relative to the supporting rod 100 during shooting to affect the shooting effect, such that the mobile device holder for tracking shots can be used as a selfie stick in a folded storage state of the tripod assembly 110, thereby increasing the applicable scenarios of the mobile device holder for tracking shots.

Specifically, the locking assembly 500 includes a movable member 510 and a plurality of teeth 520, the movable member 510 is movably disposed on one side of the rotating base 200, a tooth groove 512 is formed at one end of the movable member 510, and the plurality of teeth 520 are annularly arranged at the other end of the supporting rod 100; and when the locking assembly 500 is in the locked state, the tooth groove 512 is engaged with part of the teeth 520, such that the rotation of the rotating base 200 is limited by a snip-fitting cooperation of the tooth groove 512 and the teeth 520; and when the locking assembly 500 is in the unlocked state, the tooth groove 512 is disengaged from the teeth 520, such that the motor 600 can drive the rotating base 200 to rotate to realize the function of tracking shots.

Further, the locking assembly 500 further includes a positioning member 530, the positioning member 530 is disposed inside the rotating base 200, an elastic protrusion 531 is disposed on one side of the positioning member 530 facing the movable member 510, at least two grooves 513 are formed at intervals on one side of the movable member 510 facing the positioning member 530, the movable member 510 is slidably disposed in a vertical direction to cooperate with the grooves 513 through the elastic protrusion 531 and to position the sliding of the movable member 510, such that when the locking assembly 500 is in the locked state, the elastic protrusion 531 slides into one of the grooves 513 to position of the sliding of the movable member 510; and when the locking assembly 500 is in the unlocked state, the elastic protrusion 531 slides into another groove 513 to position the sliding of the movable member 510, featuring a simple, stable and reliable structure.

Optionally, a guide groove 534 that extends vertically is formed on one side of the positioning member 530 facing the movable member 510 is provided with, the movable member 510 is slidably disposed inside the guide groove 534, a sliding key 511 is disposed on one side of the movable member 510 away from the positioning member 530, a sliding groove 231 is formed on one side of the rotating base 200, the sliding key 511 is slidably accommodated in the sliding groove 231, the movable member 510 is located between the positioning member 530 and a slide wall of the rotating base 200, such that a user can switch between the locked state and the unlocked state by pushing the sliding key 511 up and down with his finger in the sliding groove 231.

Preferably, a through groove 533 is formed on the positioning member 530, an elastic plate 532 is disposed inside the through groove 533, one end of the elastic plate 532 is connected to one side wall of the through groove 533, and the elastic protrusion 531 is disposed on one side of the elastic plate 532 facing the movable member 510, where the movable member 510 is roughly plate-shaped, the positioning member 530, the elastic plate 532 and the elastic protrusion 531 are integrally molded and mode of plastic material, and the elastic protrusion 531 can slide into or out of the groove 513 more smoothly through elastic force of the elastic plate 532.

In this embodiment, the rotating base 200 includes a base body 230 and a bottom cover 240 that are engaged to form an accommodating space between the base body 230 and the bottom cover 240, the motor 600 is installed inside the accommodating space, the driving shaft 610 of the motor 600 passes through the bottom cover 240 and is connected to the other end of the supporting rod 100, the base body 230 and the bottom cover 240 are locked by a screw column for fixing, a mounting slot 241 is formed on the bottom cover 240, and a bottom of the positioning member 530 is inserted into the mounting slot 241.

Specifically, the other end of the supporting rod 100 is provided with an end cover 120, a slot 121 is formed at a center of the end cover 120, the driving shaft 610 of the motor 600 is inserted into the slot 121, the driving shaft 610 and the slot 121 cannot rotate relative to each other, an insertion rod 123 is disposed on a bottom of the end cover 120 to be inserted and fixed at one end of the supporting rod 100 through the insertion rod 123, the insertion rod 123 and the supporting rod 100 cannot rotate relative to each other, and the supporting rod 100 can be a telescopic rod capable of being telescopic in its length direction, such that the rotating base 200 can rotate around an axis direction of the supporting rod 100.

In this embodiment, a rotating bearing 700 is disposed between the bottom cover 240 and the end cover 120, a bottom of the bottom cover 240 protrudes downwards to form a tube wall 242, an accommodating cavity 122 is formed on an upper portion of the end cover 120, an inner ring of the rotating bearing 700 is sleeved on the tube wall 242, an outer ring of the rotating bearing 700 is accommodated in the accommodating cavity 122, and the outer ring of the rotating bearing 700 is tightly matched with an inner wall of the accommodating cavity 122, such that the rotating base 200 and the end cover 120 are rotationally connected through the rotating bearing 700 to improve the stability and reliability of the rotation of the rotating seat 200, featuring a simple structure convenient to assemble.

Specifically, the rotating base 200 is provided with a first lug portion 210, and one end of the handle assembly 400 is provided with a second lug portion 430, such that the first lug portion 210 and the second lug portion 430 are rotationally connected by a pivot axis, and the pivot shaft can adopt a screw structure.

Further, a first threading opening 211 is formed on the first lug portion 210, the first threading opening 211 is communicated with an interior of the rotating base 200, a second threading opening 431 is formed on the second lug portion 430, and the second threading opening 431 is communicated with an interior of the handle assembly 400, such that a cable is electrically connected to the motor 600 inside the rotating base 200 and the electric control board 480 inside the handle assembly 400 through the first threading opening 211 and the second threading opening 431, respectively.

In this embodiment, the mobile device holder for tracking shots further includes a battery, the battery is configured to supply power to the electric control board 480 and the motor 600, and the battery and the electric control board 480 are both disposed inside the handle assembly 400; and the handle assembly 400 includes a left housing 460 and a right housing 470 that are interlocked, and the camera lens 410 is specifically disposed on the front side of the handle assembly 400 to always capture the human face images of the user.

Preferably, the mobile device holder for tracking shots further includes a remote controller 420, the remote controller 420 is in wireless connection with the electric control board 480, an accommodating groove is formed on the handle assembly 400, the remote controller 420 is removably accommodated inside the accommodating groove 450, the remote controller 420 can be used for remotely controlling the mobile device holder for tracking shots, and can also be used for remotely controlling the electronic device to shoot, and the remote controller 420 is in wireless connection with the electronic device.

Further, an opening is formed one side wall of the accommodating groove 450, such that the remote controller 420 slides into the accommodating groove 450 or slides out of the accommodating groove 450 through the opening, an inner wall of the accommodating groove 450 is provided with a protruding rib 451, and a strip-shaped groove 421 is formed on a side surface of the remote controller 420 to guide the remote controller 420 to slide into the accommodating groove 450 or slide out of the accommodating groove 450 through sliding cooperation between the protruding rib 451 and the strip-shaped groove 421, such that the remote controller 420 can be placed on the handle assembly 400 for use, or can be removed from the accommodating groove 450 for use, making the use more flexible.

Optionally, an elastic telescopic member 440 is disposed on one end of the handle assembly 400, and a recess 250 is formed on the rotating base 200. Specifically, the recess 250 is disposed below the first lug portion 210, such that an end of the elastic telescopic member 440 is snapped into the recess 250 to prevent the handle assembly 400 from rotating, and the rotation of the handle assembly 400 can be positioned through the cooperation between the elastic telescopic member 440 and the recess 250 when the handle assembly 400 rotates relative to the supporting rod 100 and is in the folded storage state, thereby improving the stability and reliability of the mobile device holder for tracking shots in the folded storage state.

Further, the elastic telescopic member 440 includes an elastic member 442 and a rod member 441, the rod member 441 is disposed inside the handle assembly 400, one end of the rod member 441 penetrates out of one end of the handle assembly 400, the elastic member 442 is disposed between the other end of the rod member 441 and an inner wall of the handle assembly 400, an opening is formed on one end of the handle assembly 400, one end of the rod member 441 is inserted into the opening to exert acting force through the elastic member 442 on the rod member 441 to pass through the opening, and a flange is disposed on the other end of the rod member 441 to prevent the rod member 441 from passing through the opening by abutting the flange against an end surface of the opening.

Specifically, a third lug portion 310 is disposed on one end of the clamping assembly 300, and a fourth lug portion 220 is disposed on the rotating base 200, such that the third lug portion 310 and the fourth lug portion 220 are rotationally connected through a bolt 320, where the clamping assembly 300 includes a connecting plate 330 and a clamping portion 340, the third lug portion 310 is disposed at one end of the connecting plate 330, and the other end of the connecting plate 330 is rotationally connected to the clamping portion 340, two opposite clamping plates 342 are rotationally disposed on the clamping portion 340, and rotation angles of the two clamping plates 342 are both 90 degrees, such that a spring can be disposed between the clamping plates 342 and the clamping portion 340, the electronic devices, such as a mobile phone or an iPad, can be tightly clamped between the two clamping plates 342 through elastic force of the spring, and a storage groove 341 is formed on the clamping portion 340 for the clamping plates 342 to rotate and be folded and stored. The clamping assembly 300 in this embodiment is the prior art, which will not be described in detailed herein.

Specifically, the tripod assembly 110 includes four supporting legs 112, a connecting rod 113 corresponding to the supporting leg 112, and a lantern ring 111 slidably sleeved on the supporting rod 100; the four supporting legs 112 are evenly disposed in a circumferential direction of the supporting rod 100, an upper end of each supporting leg 112 is rotationally connected to the lantern ring 111, one end of the connecting rod 113 is connected to one end of the supporting rod 100, and the other end of the connecting rod 113 is rotationally connected to a middle part of the corresponding supporting leg 112, where the tripod assembly 110 can be folded, and the folded tripod assembly 110 is tightly attached to the supporting rod 100 for easy carrying and storage.

It should be understood that when an element is referred to as being "on" or "connected to" another element, it can be directly on the other element or directly connected to the other element or indirectly connected to the other element by an intervening element therebetween. On the contrary, when an element is referred to as being "directly on" or "directly connected to" another element, there are no intervening elements therebetween. Also, it should be noted that if directional indications (such as up, down, left, right, front, back, etc.) are involved in the embodiment of the present disclosure, the directional indications are only used to explain a relative position relationship, a movement condition and the like between various components under a certain posture (as shown in the accompanying drawings). If the specific posture changes, the directional indication changes accordingly.

The description above is merely the preferred embodiments of the present disclosure, it should be pointed out that those of ordinary skill in the art can also make some improvements and modifications without departing from the principle of the present disclosure, and these improvements and modifications should also fall within the scope of protection of the present disclosure.

What is claimed is:

1. A mobile device holder for tracking shots, comprising:
   a supporting rod, one end of the supporting rod is provided with a foldable tripod assembly;
   a rotating base, the rotating base is rotationally installed at the other end of the supporting rod;
   a motor, the motor is disposed inside the rotating base to drive the rotating base through the motor to rotate relative to the supporting rod;
   a clamping assembly, one end of the clamping assembly is rotationally connected to the rotating base, and the clamping assembly is configured to clamp an electronic device;
   a handle assembly, one end of the handle assembly is rotationally connected to the rotating base;
   a camera lens, the camera lens is disposed on the handle assembly or the clamping assembly; and
   an electric control board, the electric control board is electrically connected to the motor and the camera lens to control the operation of the motor according to images acquired by the camera lens through the electric control board.

2. The mobile device holder for tracking shots according to claim 1, further comprising a locking assembly, wherein the locking assembly is disposed between the rotating base and the supporting rod, and the locking assembly has a locked state and an unlocked state; when the locking assembly is in the locked state, the rotating base cannot rotate relative to the supporting rod; and when the locking assembly is in the unlocked state, the rotating base can rotate relative to the supporting rod.

3. The mobile device holder for tracking shots according to claim 2, wherein the locking assembly comprises a movable member and a plurality of teeth, the movable member is movably disposed on one side of the rotating base, a tooth groove is formed at one end of the movable member, and the plurality of teeth are annularly arranged at the other end of the supporting rod; when the locking assembly is in the locked state, the tooth groove is engaged with part of the teeth; and when the locking assembly is in the unlocked state, the tooth groove is disengaged from the teeth.

4. The mobile device holder for tracking shots according to claim 3, wherein the locking assembly further comprises a positioning member, and the positioning member is disposed inside the rotating base, an elastic protrusion is disposed on one side of the positioning member facing the movable member, at least two grooves are formed at intervals on one side of the movable member facing the positioning member, and the movable member is slidably disposed in a vertical direction to cooperate with the grooves through the elastic protrusion and to position the sliding of the movable member.

5. The mobile device holder for tracking shots according to claim 4, wherein a guide groove that extends vertically is formed on one side of the positioning member facing the movable member is provided with, the movable member is slidably disposed inside the guide groove, a sliding key is disposed on one side of the movable member away from the positioning member, a sliding groove is formed on one side of the rotating base, and the sliding key is slidably accommodated in the sliding groove.

6. The mobile device holder for tracking shots according to claim 4, wherein a through groove is formed on the positioning member, an elastic plate is disposed inside the through groove, one end of the elastic plate is connected to one side wall of the through groove, and the elastic protrusion is disposed on one side of the elastic plate facing the movable member.

7. The mobile device holder for tracking shots according to claim 1, wherein the rotating base comprises a base body and a bottom cover that are engaged to form an accommodating space between the base body and the bottom cover, the motor is installed inside the accommodating space, and a driving shaft of the motor passes through the bottom cover and is connected to the other end of the supporting rod.

8. The mobile device holder for tracking shots according to claim 7, wherein the other end of the supporting rod is provided with an end cover, a slot is formed at a center of the end cover, and the driving shaft of the motor is inserted into the slot.

9. The mobile device holder for tracking shots according to claim 8, wherein a rotating bearing is disposed between the bottom cover and the end cover, a bottom of the bottom cover protrudes downwards to form a tube wall, an accommodating cavity is formed on an upper portion of the end cover, an inner ring of the rotating bearing is sleeved on the tube wall, and an outer ring of the rotating bearing is accommodated in the accommodating cavity.

10. The mobile device holder for tracking shots according to claim 1, wherein the rotating base is provided with a first lug portion, and one end of the handle assembly is provided with a second lug portion, such that the first lug portion and the second lug portion are rotationally connected by a pivot axis.

11. The mobile device holder for tracking shots according to claim 10, wherein a first threading opening is formed on the first lug portion, the first threading opening is communicated with an interior of the rotating base, a second threading opening is formed on the second lug portion, and the second threading opening is communicated with an interior of the handle assembly.

12. The mobile device holder for tracking shots according to claim 11, further comprising a battery, wherein the battery is configured to supply power to the electric control board and the motor, and the battery and the electric control board are both disposed inside the handle assembly.

13. The mobile device holder for tracking shots according to claim 1, further comprising a remote controller, wherein the remote controller is in wireless connection with the electric control board, an accommodating groove is formed on the handle assembly, and the remote controller is removably accommodated inside the accommodating groove.

14. The mobile device holder for tracking shots according to claim 13, wherein an opening is formed on one side wall of the accommodating groove, such that the remote controller slides into the accommodating groove or slides out of the accommodating groove through the opening, an inner wall of the accommodating groove is provided with a protruding rib, and a strip-shaped groove is formed on a side surface of the remote controller to guide the remote controller to slide into the accommodating groove or slide out of the accommodating groove through sliding cooperation between the protruding rib and the strip-shaped groove.

15. The mobile device holder for tracking shots according to claim 10, wherein an elastic telescopic member is disposed on one end of the handle assembly, and a recess is formed on the rotating base, such that an end of the elastic telescopic member is snapped into the recess to prevent the handle assembly from rotating.

16. The mobile device holder for tracking shots according to claim 15, wherein the elastic telescopic member comprises an elastic member and a rod member, the rod member is disposed inside the handle assembly, one end of the rod member penetrates out of one end of the handle assembly, and the elastic member is disposed between the other end of the rod member and an inner wall of the handle assembly.

17. The mobile device holder for tracking shots according to claim 1, wherein a third lug portion is disposed on one end of the clamping assembly, and a fourth lug portion is disposed on the rotating base, such that the third lug portion and the fourth lug portion are rotationally connected through a bolt.

* * * * *